(12) United States Patent
Mishra et al.

(10) Patent No.: US 10,776,579 B2
(45) Date of Patent: Sep. 15, 2020

(54) GENERATION OF VARIABLE NATURAL LANGUAGE DESCRIPTIONS FROM STRUCTURED DATA

(71) Applicant: International Business Machines Corporation, Armonk, NY (US)

(72) Inventors: Abhijit Mishra, Bangalore (IN); Parag Jain, Jabalpur (IN); Anirban Laha, Bangalore (IN); Karthik Sankaranarayanan, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 16/120,979

(22) Filed: Sep. 4, 2018

(65) Prior Publication Data

US 2020/0073944 A1    Mar. 5, 2020

(51) Int. Cl.
| | | |
|---|---|---|
| *G06F 17/27* | (2006.01) | |
| *G06F 40/247* | (2020.01) | |
| *G06F 16/26* | (2019.01) | |
| *G06F 16/28* | (2019.01) | |
| *G06F 40/205* | (2020.01) | |

(52) U.S. Cl.
CPC ............ *G06F 40/247* (2020.01); *G06F 16/26* (2019.01); *G06F 16/288* (2019.01); *G06F 40/205* (2020.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | |
|---|---|---|---|
| 9,501,530 B1* | 11/2016 | Jacobsson | G06F 16/9024 |
| 9,542,450 B1* | 1/2017 | Jacobsson | G06F 16/9535 |
| 9,754,585 B2 | 9/2017 | Brockett et al. | |
| 9,922,125 B1* | 3/2018 | Jacobsson | G06F 16/9535 |
| 10,216,851 B1* | 2/2019 | Jacobsson | G06F 16/9535 |

(Continued)

OTHER PUBLICATIONS

Bontcheva et al., Bontcheva, Automatic report generation from ontologies: The MIAKT approach, International conference on application of natural language to information systems, pp.=324-335, 2004 (Year: 2004).*

(Continued)

*Primary Examiner* — Lamont M Spooner
(74) *Attorney, Agent, or Firm* — Ryan, Mason & Lewis, LLP

(57) ABSTRACT

Techniques for the generation of variable natural language descriptions from structured data are disclosed including receiving input data and generating a first plurality of tuples based on the received input data. A first plurality of sentences and a corresponding second plurality of tuples are obtained from a data repository based on the first plurality of tuples. A second plurality of sentences is generated based on the second plurality of tuples, the first plurality of sentences, and the first plurality of tuples. A sentence is selected from the first plurality of sentences and the second plurality of sentences for each of the first plurality of tuples. At least one paragraph variation is generated where each paragraph variation is generated based on two or more of the selected sentences. The at least one paragraph variation is presented as a natural language description of the input data.

20 Claims, 10 Drawing Sheets

(56) References Cited

U.S. PATENT DOCUMENTS

| | | | | |
|---|---|---|---|---|
| 10,572,606 | B1* | 2/2020 | Paley | G06F 40/174 |
| 10,585,983 | B1* | 3/2020 | Paley | G06N 5/02 |
| 10,614,141 | B2* | 4/2020 | Pawar | G06F 16/9024 |
| 2007/0055656 | A1* | 3/2007 | Tunstall-Pedoe | G06F 40/40 |
| 2008/0120283 | A1* | 5/2008 | Liu | G06F 16/83 |
| 2009/0192968 | A1* | 7/2009 | Tunstall-Pedoe | G06N 5/02 706/47 |
| 2011/0307435 | A1* | 12/2011 | Overell | G06F 40/295 706/46 |
| 2015/0371651 | A1* | 12/2015 | Aharoni | G06F 40/56 704/201 |
| 2016/0378853 | A1* | 12/2016 | Mohammad | G06F 16/3344 707/706 |
| 2017/0052950 | A1 | 2/2017 | Danielyan et al. | |
| 2018/0075025 | A1 | 3/2018 | Bird et al. | |
| 2018/0075359 | A1* | 3/2018 | Brennan | G06N 5/022 |
| 2018/0268063 | A1* | 9/2018 | Pawar | G06F 16/248 |
| 2018/0336183 | A1* | 11/2018 | Lee | G06F 40/30 |
| 2019/0272325 | A1* | 9/2019 | Korn | G06F 40/166 |
| 2019/0318249 | A1* | 10/2019 | Xu | G06F 16/3329 |
| 2019/0354544 | A1* | 11/2019 | Hertz | G06N 5/02 |
| 2020/0034465 | A1* | 1/2020 | Brake | G06F 16/3323 |

OTHER PUBLICATIONS

Lebret et al., Neural text generation from structured data with application to the biography domain, arXiv:1603.07771v3 [cs.CL], 2016 (Year: 2016).* arria.com, "Studio Overview—Arria NLG," http://arria.com/studio/studio-overview/, downloaded Sep. 4, 2018, 2 pages.

Narrative Science, "Quill: A.I. that Transforms Data into Contextually-Rich Information," http://narrativescience.com/Plafform, downloaded Sep. 4, 2018, 2 pages.

R. Lebret et al., "Neural Text Generation from Structured Data with Application to the Biography Domain," Proceedings of the Conference on Empirical Methods in Natural Language Processing, Nov. 1-5, 2016, pp. 1203-1213.

S. Wiseman et al., "Challenges in Data-to-Document Generation," Proceedings of the Conference on Empirical Methods in Natural Language Processing, Sep. 7-11, 2017, pp. 2253-2263.

R. Barzilay et al., "Collective Content Selection for Concept-to-Text Generation," Proceedings of Human Language Technology Conference (HLT) and Conference on Empirical Methods in Natural Language Processing, Oct. 6-8, 2005, pp. 331-338.

I. Konstas et al., "Inducing Document Plans for Concept-to-Text Generation," Proceedings of the Conference on Empirical Methods in Natural Language Processing, Oct. 18-21, 2013, pp. 1503-1514.

P. Jain et al., "A Mixed Hierarchical Attention Based Encoder-Decoder Approach for Standard Table Summarization," Proceedings of the 16th Annual Conference of the North American Chapter of the Association for Computational Linguistics: Human Language Technologies (NAACL-HLT), Jun. 1-6, 2018, pp. 622-627.

P. Nema et al., "Generating Descriptions from Structured Data Using a Bifocal Attention Mechanism and Gated Orthogonalization," Proceedings of the 16th Annual Conference of the North American Chapter of the Association for Computational Linguistics: Human Language Technologies (NAACL-HLT), Jun. 1-6, 2018, pp. 1539-1550.

Automated Insights, Inc., "Overview," https://wordsmith.readme.io/v1.8 docs, downloaded Sep. 4, 2018, 11 pages.

S. Indurthi et al., "Generating Natural Language Question-Answer Pairs from a Knowledge Graph Using a RNN Based Question Generation Model," Proceedings of the 15th Conference of the European Chapter of the Association for Computational Linguistics, Long Papers, Apr. 3-7, 2017, pp. 376-385, vol. 1.

* cited by examiner

GENERATION OF VARIABLE NATURAL LANGUAGE DESCRIPTIONS FROM STRUCTURED DATA

FIELD

The present application generally relates to the natural language generation (NLG), and, more particularly, to the generation of variable natural language descriptions from structured data.

BACKGROUND

The generation of natural language descriptions from structured data has been one of the key goals of NLG. Existing systems for such tasks may be either rule based or data driven. Rule based systems often require large amounts of manual effort to design specific rules for each domain of data and are typically not scalable across domains where the vocabulary and schema of the structures of the domains vary considerably. Data driven systems often require parallel data, e.g., data containing pairs, which may be elusive.

SUMMARY

In one embodiment of the present invention, techniques for the generation of variable natural language descriptions from structured data are provided. An exemplary computer-implemented method can include steps of receiving input data and generating a first plurality of tuples based on the received input data. A first plurality of sentences and a corresponding second plurality of tuples are obtained from a data repository based on the first plurality of tuples. The first plurality of sentences is generated based on the second plurality of tuples. A second plurality of sentences is generated based on the second plurality of tuples, the first plurality of sentences, and the first plurality of tuples. A sentence is selected from the first plurality of sentences and the second plurality of sentences for each of the first plurality of tuples. At least one paragraph variation is generated where each paragraph variation is generated based on two or more of the selected sentences. The at least one paragraph variation is presented as a natural language description of the input data.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

The generation of natural language descriptions from structured data has been one of the key goals of NLG. Existing systems for such tasks, either rule based or data driven, often have limited capabilities and suffer from numerous challenges. For example, existing systems are typically configured to accept only a specific kind of input and are not configured to accept inputs of another kind. For example, both rule-based and data driven systems are not scalable across domains where the vocabulary and schema of the structures of the domains vary considerably. For example, rule-based systems typically require huge amounts of manual effort to design rules for each domain while data driven systems typically require parallel data containing pairs, which may be elusive to obtain.

In addition, both rules based and supervised data driven paradigms typically only generate monotonous and robotic sounding outputs and do not introduce variations to these outputs at the output side.

The techniques for the generation of variable natural language descriptions from structured data disclosed herein are configured to accept a variety of forms of structured data such as, e.g., tables, graphs, key-value pairs such as, e.g., JavaScript Object Notations (JSONs), and Resource Description Framework (RDF) data. Any other form of structured data may also be accepted. The disclosed techniques output a natural language description that contains facts pertaining to each atomic entry in the structured data. The disclosed system and techniques improve over existing techniques by generating variable natural language descriptions that are more natural and non-robotic. The disclosed system and techniques are unsupervised and scalable. For example, the disclosed techniques do not require a pre-labeled input corpus of data and may accept monolingual, i.e., unlabeled, corpora during development. Such unlabeled monolingual corpora are typically abundantly available for all domains.

Figure 1:
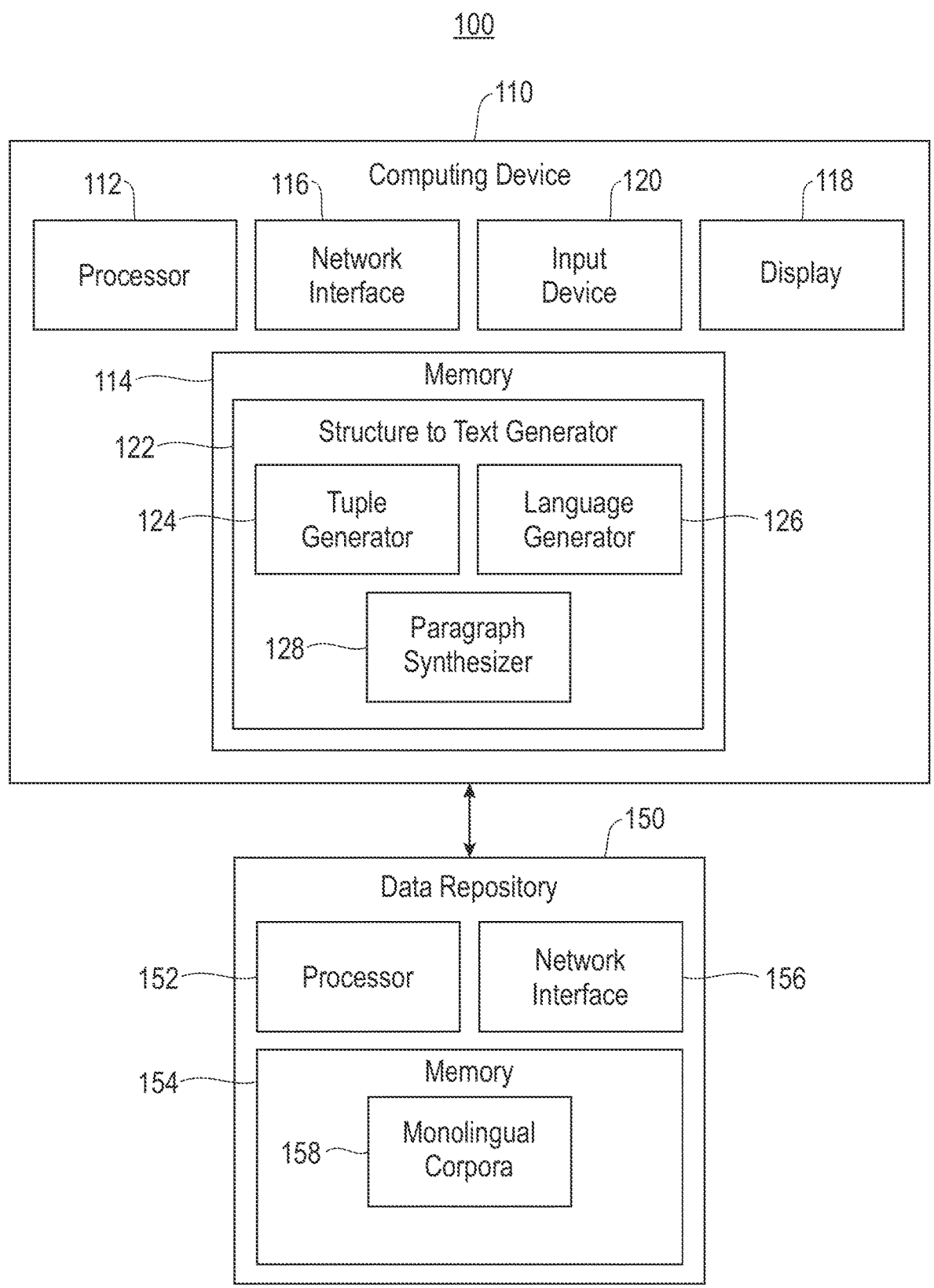
FIG. 1 is a diagram illustrating system architecture, according to an exemplary embodiment of the invention.

With reference now to FIG. 1, an embodiment of a system architecture 100 for the generation of variable natural language descriptions from structured data are illustrated. In some embodiments, system 100 includes a computing device 110, and a data repository 150.

Computing device 110 includes at least one processor 112, memory 114, at least one network interface 116, a display 118, an input device 120, and may include any other features commonly found in a computing device. In some embodiments, computing device 110 may include, for example, a personal computer, workstation, laptop, tablet, smart device, smart phone, smart watch, or any other similar computing device that may be used by a user.

Processor 112 may include, for example, a central processing unit (CPU), a microcontroller, Field Programmable Gate Array (FPGAs), or any other form of processing circuitry that is configured to perform various operations. Processor 112 may be configured to execute instructions as described below. These instructions may be stored, for example, in memory 114. As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually.

Memory 114 may include, for example, computer readable media or computer readable storage media in the form of volatile memory, such as random-access memory (RAM) and/or cache memory or others. Memory 114 may include, for example, other removable/non-removable, volatile/non-volatile storage media. By way of non-limiting examples only, memory 114 may include a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

In some embodiments, computer software including instructions or code for performing the methodologies of the invention, as described herein, may be stored in associated memory 114 and, when ready to be utilized, loaded in part or in whole (for example, into RAM) and implemented by processor 112. Such software could include, but is not limited to, firmware, resident software, microcode, and the like. The memory 114 may include local memory employed during actual implementation of the program code, bulk storage, and cache memories which provide temporary storage of at least some program code in order to reduce the number of times code must be retrieved from bulk storage during implementation.

In some embodiments, computing device 110 may include a structure-to-text generator 122, e.g., computer software instructions or code, stored in memory 114 that is configured to generate variable natural language descriptions from structured data as will be described in more detail below. In some embodiments, structure-to-text generator 122 may alternatively be stored remote from computing device 110, e.g., on a server or other system. For example, computing device 110 may access or execute structure-to-text generator 122 as part of a technique for generating variable natural language descriptions from structured data. In some embodiments, structure-to-text generator 122 may be an application programming interface (API) that is activatable or executable by computing device 110 to offload the generation of variable natural language descriptions from structured data to a remote processing center, e.g., a server or other similar system.

In some embodiments, structure-to-text generator 122 may include a tuple generator 124, a language generator 126, and a paragraph synthesizer 128.

In some embodiments, tuple generator 124, e.g., computer software instructions or code, stored in memory 114 may be configured to generate canonical tuples from received structured data as will be described in more detail below. In some embodiments, tuple generator 124 may alternatively be stored remote from computing device 110, e.g., on a server or other system. For example, computing device 110 may access or execute tuple generator 124 as part of a technique for generating variable natural language descriptions from structured data. In some embodiments, tuple generator 124 may be an application programming interface (API) that is activatable or executable by computing device 110 to offload the generation of variable natural language descriptions from structured data to a remote processing center, e.g., a server or other similar system.

In some embodiments, language generator 126, e.g., computer software instructions or code, stored in memory 114 may be configured to generate sentences based on tuples as will be described in more detail below. In some embodiments, language generator 126 may alternatively be stored remote from computing device 110, e.g., on a server or other system. For example, computing device 110 may access or execute language generator 126 as part of a technique for generating variable natural language descriptions from structured data. In some embodiments, language generator 126 may be an application programming interface (API) that is activatable or executable by computing device 110 to offload the generation of variable natural language descriptions from structured data to a remote processing center, e.g., a server or other similar system.

In some embodiments, paragraph synthesizer 128, e.g., computer software instructions or code, stored in memory 114 may be configured to synthesize paragraph variations based on sentences as will be described in more detail below. In some embodiments, paragraph synthesizer 128 may alternatively be stored remote from computing device 110, e.g., on a server or other system. For example, computing device 110 may access or execute paragraph synthesizer 128 as part of a technique for generating variable natural language descriptions from structured data. In some embodiments, paragraph synthesizer 128 may be an application programming interface (API) that is activatable or executable by computing device 110 to offload the generation of variable natural language descriptions from structured data to a remote processing center, e.g., a server or other similar system.

Network interface 116 is configured to transmit and receive data or information to and from a data repository 150 or any other server, component, or computing device via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 110 to transmit or receive information to or from data repository 150 including components of data repository 150.

Display 118 may include any display device that is configured to display information to a user of computing device 110. For example, in some embodiments, display 118 may include a computer monitor, television, smart television, or other similar displays. In some embodiments, display 118 may be integrated into or associated with computing device 110, for example, as a display of a laptop, smart phone, smart watch, or other smart wearable devices, as a virtual reality headset associated with computing device 110, or any other mechanism for displaying information to a user. In some embodiments, display 118 may include, for example, a liquid crystal display (LCD), an e-paper/e-ink display, an organic LED (OLED) display, or other similar display technologies. In some embodiments, display 118 may be touch-sensitive and may also function as an input device 120.

Input device 120 may include, for example, a keyboard, a mouse, a touch-sensitive display 118, a keypad, a microphone, or other similar input devices or any other input devices that may be used alone or together to provide a user with the capability to interact with computing device 110.

Data repository 150 may include a processor 152, memory 154, and a network interface 156 that may include similar functionality as processor 112, memory 114, and network interface 116. In some embodiments, data repository 150 may, for example, be any computing device, server, database or similar system, or any combination thereof, that is configured to interact with or provide data to computing device 110. In some embodiments, for example, data repository 150 may include a distributed storage system including a plurality of servers, databases, or other components. In some embodiments, the data stored in data repository 150 may alternatively be stored in memory 114 of computing device 110 for use by computing device 110 such that no connection to a data repository 150 may be necessary to obtain the data.

In some embodiments, data repository 150 may store a monolingual corpus of sentences 158 for each of a plurality of domains. In some embodiments, the corpora of sentences may be monolingual where no labels are provided for the sentences.

Figure 2:
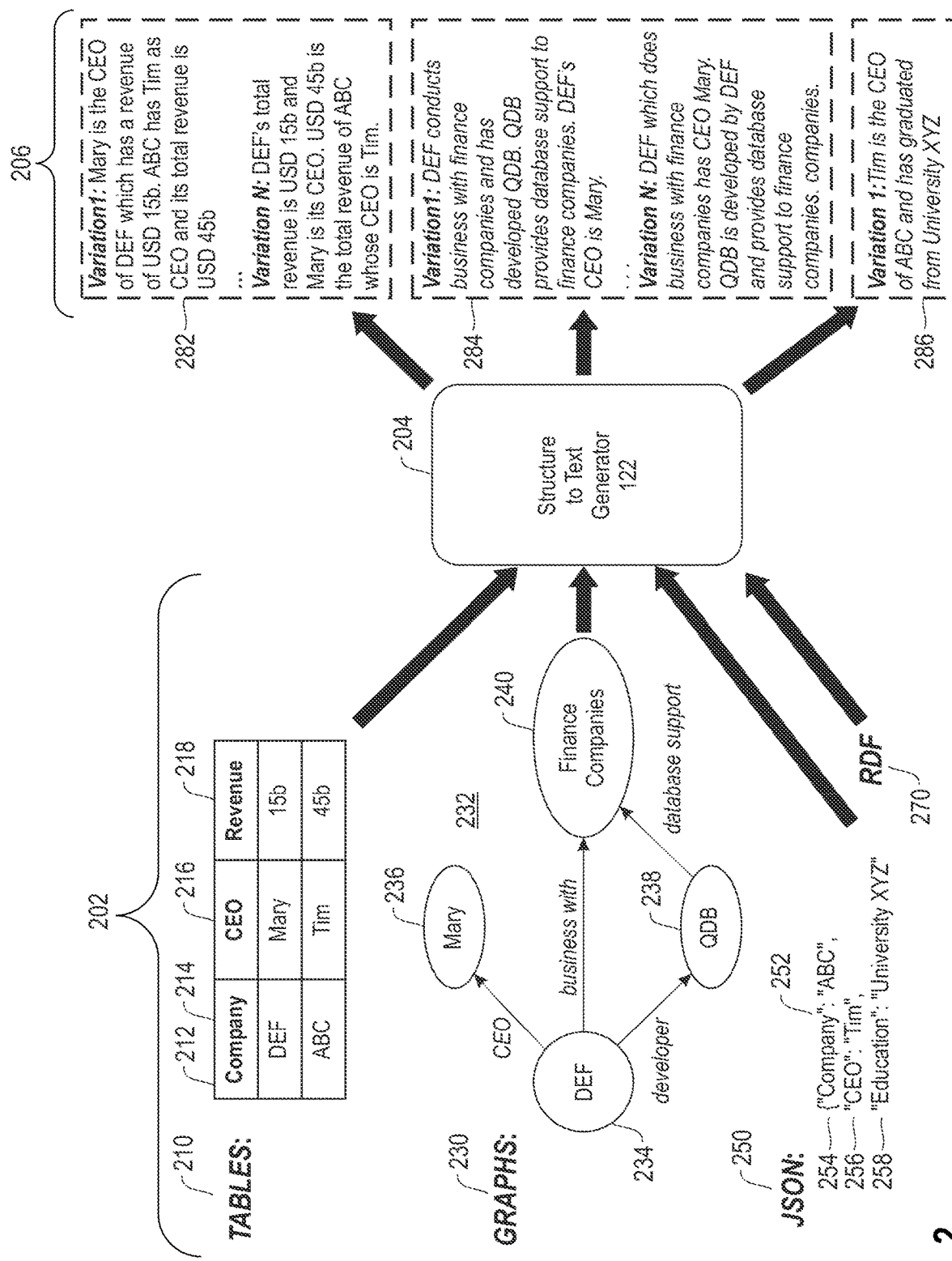
FIG. 2 is a high-level flow diagram illustrating techniques for generating variable natural language descriptions from structured data according to an embodiment of the invention.

FIG. 2 is a diagram illustrating an example high level flow for a technique for generating variable natural language descriptions from structured data.

At 202, input data may be obtained, read, input, or otherwise received by computing device 110.

In some embodiments, input data may include any structured data domain including, for example, table data 210, graph data 230, JSON data 250, RDF data 270, or any other structured data domain. For example, each data domain may indicate relationships between various entities or data points.

An example of table data 210 may include a table 212 which indicates relationships between a company 214, a CEO 216, and revenue 218. For example, table 212 indicates that company DEF has a CEO Mary and a revenue of 15b. Table 212 also includes that a company ABC has a CEO Tim and a revenue of 45b.

An example of graph data 230 may include a graph 232 which indicates relationships between a company 234, CEO 236, product 238, and customer 240. For example, graph 232 indicates that company DEF has a CEO Mary and does business with finance companies as customers. Graph 232 also indicates that company DEF develops a product QDB and provides database support to the finance companies using the product QDB.

An example JSON data 250 may include JSON 252 which indicates a relationship between a company 254 of ABC, a CEO 256 of Tim, and an education 258 of University XYZ.

At 204, the input data are obtained by or provided to structure-to-text generator 122. Structure-to-text generator 122 may include, for example, tuple generator 124, language generator 126, and paragraph synthesizer 128. Structure-to-text generator 122 processes the input data and generates natural language descriptions of the input data as outputs in the form of a plurality of paragraph variations.

For example, at 206 structure-to-text generator 122 generates paragraph variations 282 from example table 212, paragraph variations 284 from example graph 232, and paragraph variations 286 from example JSON 252. For example, structure-to-text generator 122 may generate N paragraph variations where N may be a predetermined number, obtained from a user input, e.g., via input device 120, or determined in any other manner.

As an example, paragraph variations 282 may include N paragraph variations generated based on example table 212. Each paragraph variation is a natural language description of the data and relationships found in table 212. In some embodiments, each paragraph variation generated for particular input data are unique. For example, paragraph variations 282 include a variation 1 that discusses, in order, Mary, CEO, DEF, and DEF's revenue in one sentence followed by a discussion, in order, of ABC, Tim, CEO, and ABC's revenue in a second sentence. Paragraph variations 282 also include a variation N that discusses, in order, DEF, DEF's revenue, CEO, and Mary in a first sentence followed by a discussion, in order, of ABC's revenue, ABC, CEO, and Tim in a second sentence. These example paragraph variations show examples of ways in which the content of table 212 may be described in a natural language description generated by structure-to-text generator 122. While variations 1 and N are shown for illustrative purposes, any other number of variations of the natural language descriptions of the content of table 212 may be generated by structure-to-text generator 122.

As another example, paragraph variations 284 may include N paragraph variations generated based on example graph 232. Each paragraph variation is a natural language description of the data and relationships found in graph 232. In some embodiments, each paragraph variation generated for a particular input data are unique. For example, paragraph variations 284 include a variation 1 that discusses, in order, DEF, business with, finance companies, developed, and QDB in a first sentence followed by a discussion, in order, of QBD, database support, and finance companies, in a second sentence and a discussion of DEF, CEO, and Mary in a third sentence. Paragraph variations 284 also include a variation N that discusses, in order, DEF, business with, finance companies, CEO, and Mary in a first sentence followed by a discussion, in order, of QDB, developed, DEF, database support, finance companies in a second sentence. These example paragraph variations show examples of ways in which the content of graph 232 may be described in a natural language description generated by structure-to-text generator 122. For example, as can be seen in FIG. 2, the content of graph 232 is described in three sentences in variation 1 and only two sentences in variation N. While variations 1 and N are shown for illustrative purposes, any other number of variations of the natural language descriptions of the content of graph 232 may be generated by structure-to-text generator 122.

As another example, paragraph variations 286 may include N paragraph variations generated based on example JSON 252. Each paragraph variation is a natural language description of the data found in JSON 252. In some embodiments, each paragraph variation generated for a particular input data are unique. For example, paragraph variations 286 include a variation 1 that discusses, in order, Tim, CEO, ABC, graduated from (i.e., education), and University XYZ, a sentence. This example paragraph variation shows an example of a way in which the content of JSON 252 may be described in a natural language description generated by structure-to-text generator 122. While variation 1 is shown for illustrative purposes, any number of other variations of the natural language descriptions of the content of JSON 252 may be generated by structure-to-text generator 122.

The function of structure-to-text generator 122 will now be described with reference to FIG. 3. Structure-to-text generator 122 is configured to accept all possible forms of structured data such as, e.g., tables, graphs, key-value pairs (JSONs), RDFs, or other structured data. The natural language description output by structure-to-text generator 122 contains facts pertaining to each atomic entry in the structured data. Structure-to-text generator 122 generates variable descriptions for each input to present a more natural language description that may be varied for each presentation to ensure that the descriptions are not repetitive. In some embodiments, the techniques used by structure-to-text generator 122 for generation of the natural language descriptions is unsupervised and domain independent. Parallel or labelling in the input data are not required.

Figure 3:
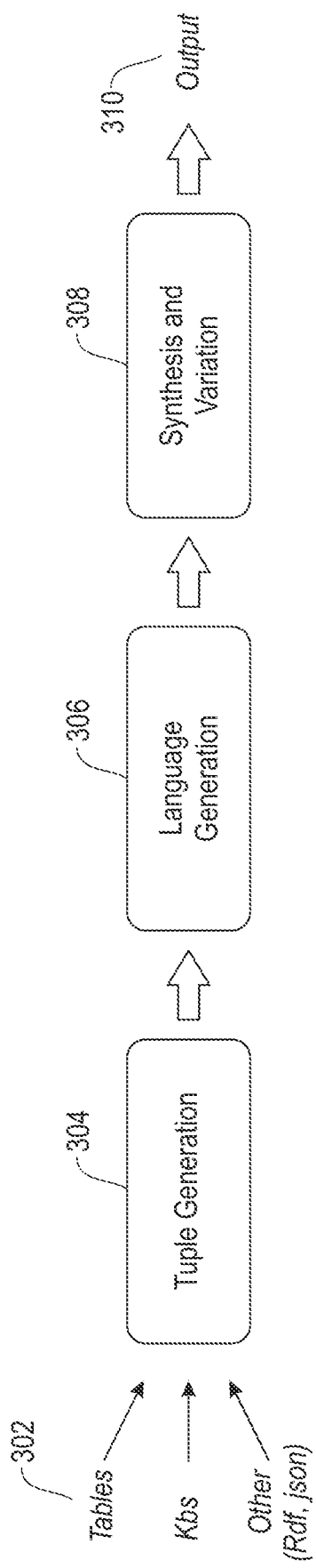
FIG. 3 is a flow diagram illustrating techniques for generating variable natural language descriptions from structured data according to an embodiment of the invention.

FIG. 3 is a diagram illustrating an example high level flow for structure-to-text generator 122.

At 302, input data are obtained, for example, from tables, graphs, JSON's, RDFs, or any other data domain. In some embodiments, the input data may be structured input data.

Figure 4:
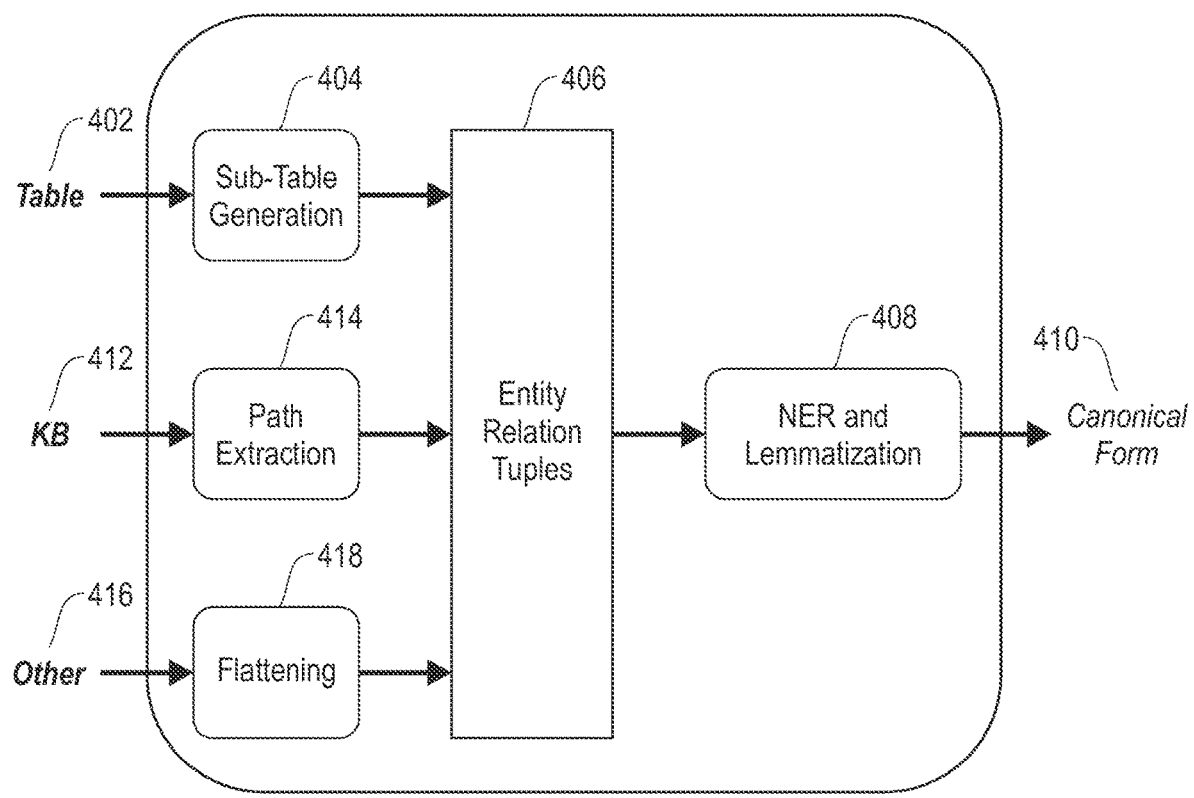
FIG. 4 is a flow diagram illustrating techniques for generating tuples from input data according to an embodiment of the invention.

At 304, the obtained input data are canonicalized by tuple generator 124 into a plurality of tuples. Canonicalization involves the conversion of tables, graphs and other data domains into entity-relation tuples. An example flow for canonicalization that may be executed by tuple generator 124 is illustrated in FIG. 4.

At 402, in an illustrative embodiment, table data are obtained as input data.

Figure 5:
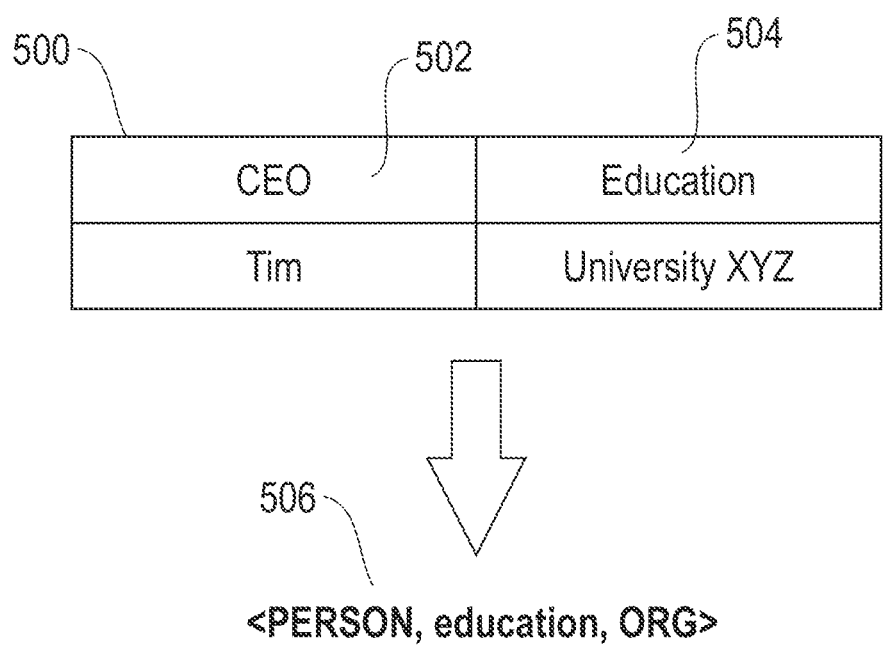
FIG. 5 is a diagram illustrating an example generation of a tuple from an input table according to an embodiment of the invention.

At 404, the table data are obtained and sub-tables are generated from the table data. For example, with reference to FIG. 5, an example table 500 may include a sub-table 502 for CEO and a sub-table 504 for education. An example of a sub-table may include {CEO: Tim, Education: University XYZ}. Referring back to FIG. 2, extracted sub-tables from table 212 may include, for example, {Company: DEF, CEO: Mary, Revenue: 15b} and {Company: ABC, CEO: Tim, Revenue: 45b}. Another example of a sub-table may include {Company: DEF, Location: Armonk}. For example, where table 212 includes three header columns and two rows of data for each column, a sub-table may represent the data of a single row for two or more of the header columns.

At 406, an entity relation tuple is generated based on the sub-tables extracted from the data table. For example, tuple generator 124 may be configured to analyze the data in the sub-tables to identify entities and relationships, e.g., CEO, Tim, Education, and University XYZ. Tuple generator 124 may generate a raw tuple based on the identified entities and relationships, for example, <DEF, location, Armonk>, <Tim, education, University XYZ>, <DEF, CEO, Mary>, <DEF, Revenue, 15b>, <ABC, CEO, Tim>, or other similar raw tuples.

At 408, tuple generator 124 may perform named entity recognition (NER) and lemmatization on each raw tuple to transform each raw tuple into a domain independent canonical form. For example, <DEF, location, Armonk> may analyzed by tuple generator using NER to identify a domain independent type for each entity in the tuple. For example, DEF may be identified as an entity of the type ORG (i.e., an organization), location may be kept as is since it is not an entity, and Armonk may be identified as an entity of the type LOC (i.e., a location). The domain independent tuple may then be generated as <ORG, location, LOC>. As another example, with reference to FIG. 5, the tuple <Tim, education, University XYZ> may be modified to a domain independent tuple 506 of <PERSON, education, ORG>.

Referring again to FIG. 4, the domain independent tuple may not, on its own, be ready for use in generating a natural language description, e.g., a sentence or paragraph. For example, the word "location" in <ORG, location, LOC> may not be useful in a sentence to link the ORG and LOC together since it is not a verb. In some embodiments, tuple generator 124 may convert the word "location" into a verb or verb-phrase. For example, tuple generator 124 may identify the N most similar words to "location", e.g., using word to vector embeddings. A word to vector embedding is a D-dimensional vector which represents linguistic properties of a word where each of the words in a vocabulary of a language may be mapped to a unique vector. For a word, the corresponding word vector embedding may be obtained. The similarity between the obtained vector and all other vectors of all other words in the vocabulary is computed, for example, using a vector similarity technique. In this manner, the top N words that are most similar to the given word in terms of the vector similarity may be obtained. Since the word "location" will be modified to a verb, the verbs in the top N most similar words, e.g., in terms of vector similarity, may be identified and may be used to query or access a lexical database for their gloss and examples to determine which verb has a maximum number of occurrences with the original words/phrases in its gloss and examples. The original words/phrases may include, for example, the data in each sub-table. For example, the original words/phrases in <DEF, location, Armonk> are DEF, location, and Armonk. In some embodiments, where the data are a phrase, such as, e.g., "has won an award", the phrase may be used as the original word/phrase.

In some embodiments, the lexical database may store, for example, nouns, verbs, adjectives and adverbs and may group nouns, verbs, adjectives, and adverbs into sets of cognitive synonyms. For example, each cognitive synonym may express a distinct concept. For example, cognitive synonyms may be interlinked by means of conceptual-semantic and lexical relations. The resulting network of meaningfully related words and concepts may then be queried with a term to identify a list of alternative terms that are available for use in the same context. In some embodiments, the lexical database may include relationships between both words and the sense or context of how the words are used in language. For example, words that are found in close proximity to one another in the network will often be semantically disambiguated. In addition, the semantic relations among the words may be labeled for later use. In some embodiments, for example, memory 114 of computing device 110, memory 154 of data repository 150, or any other computing device may store the lexical database.

In this example, the result from the lexical database may indicate that the verb "locate" has the maximum number of occurrences and the tuple may be modified to become <ORG, locate, LOC>.

As another example, the tuple <PERSON, game, SPORT> may be analyzed by tuple generator 124 and may be modified to <PERSON, play, SPORT> based on the output of the word to vector embeddings and lexical database. Note that while the word "match" may also be a synonym for a game, the tuple is not modified to <PERSON, match, SPORT> because of the gloss and example found in the lexical database. For example, even though the word "match" can also be used as a verb in some contexts, the word "match" does not occur as a verb in the context of games in the lexical database and therefore the word game is not modified to the verb match in this context.

At 410, the canonical form of the tuple, e.g., <ORG, locate, LOC>, <PERSON, play, SPORT>, or a similar tuple, is output by tuple generator 124 for use by language generator 126.

While described above with respect to table data, tuple generator 124 may also be used to generate domain independent canonical tuples based on the other types of input data domains mentioned above.

For example, at 412, graph data may be obtained by tuple generator 124 and paths may be extracted at 414. For example, the graph may be analyzed to generate sub-graphs having a format similar to those described above for the table data, e.g., {Company: DEF, CEO: Mary}, {Company: DEF, Product: QDB}, {Company: DEF, Customer: finance companies}, or other similar sub-graphs. The canonical tuples may be generated from the sub-graphs in a similar manner as described above for the sub-tables at 406, 408, and 410.

As another example, other kinds of input data such as, e.g., JSON and RDF, may be obtained at 416 and may simply be flattened, e.g., converted from multiple entries in the JSON or RDF file into an array of tuples. The canonical tuples may be generated from the flattened data in a similar manner as described above for the sub-tables at 406, 408, and 410.

In some embodiments, a relationship between the domain independent canonical tuple and the original raw tuple may be maintained. For example, while the raw tuple <Tim, education, University XYZ> may be converted into the domain independent canonical tuple <PERSON, educated, SCH>, the connection between the raw tuple and canonical tuple may be maintained for later use in generating the sentence. For example, once the domain independent placeholders/tags are obtained, e.g., PERSON, SCH, they may be stored in a data structure such as, e.g., as hash map, along with the word/phrase for which the placeholder is obtained, e.g., Tim, University XYZ. During generation of a sentence, the placeholders/tags are searched in the data-structure and the original word/phrase is identified. The identified original word/phrase may be used in place of the domain independent placeholders/tags in the generated sentence.

Figure 6:
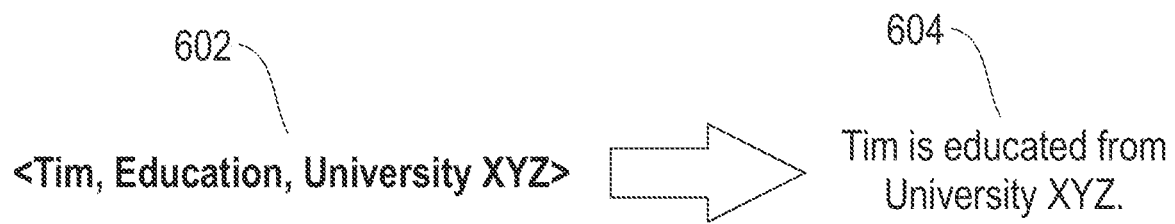
FIG. 6 is a diagram illustrating an example generation of a sentence from a tuple according to an embodiment of the invention.

Referring again to FIG. 3, at 306, sentences are generated based on the canonical tuples, for example, by language generator 126. For example, with reference to the example of FIG. 6, the canonical tuple 602 of <PERSON, educated, SCH> which corresponds to the raw tuple <Tim, education, University XYZ> may be used to generate a sentence 604, e.g., Tim is educated from University XYZ.

Figure 7:
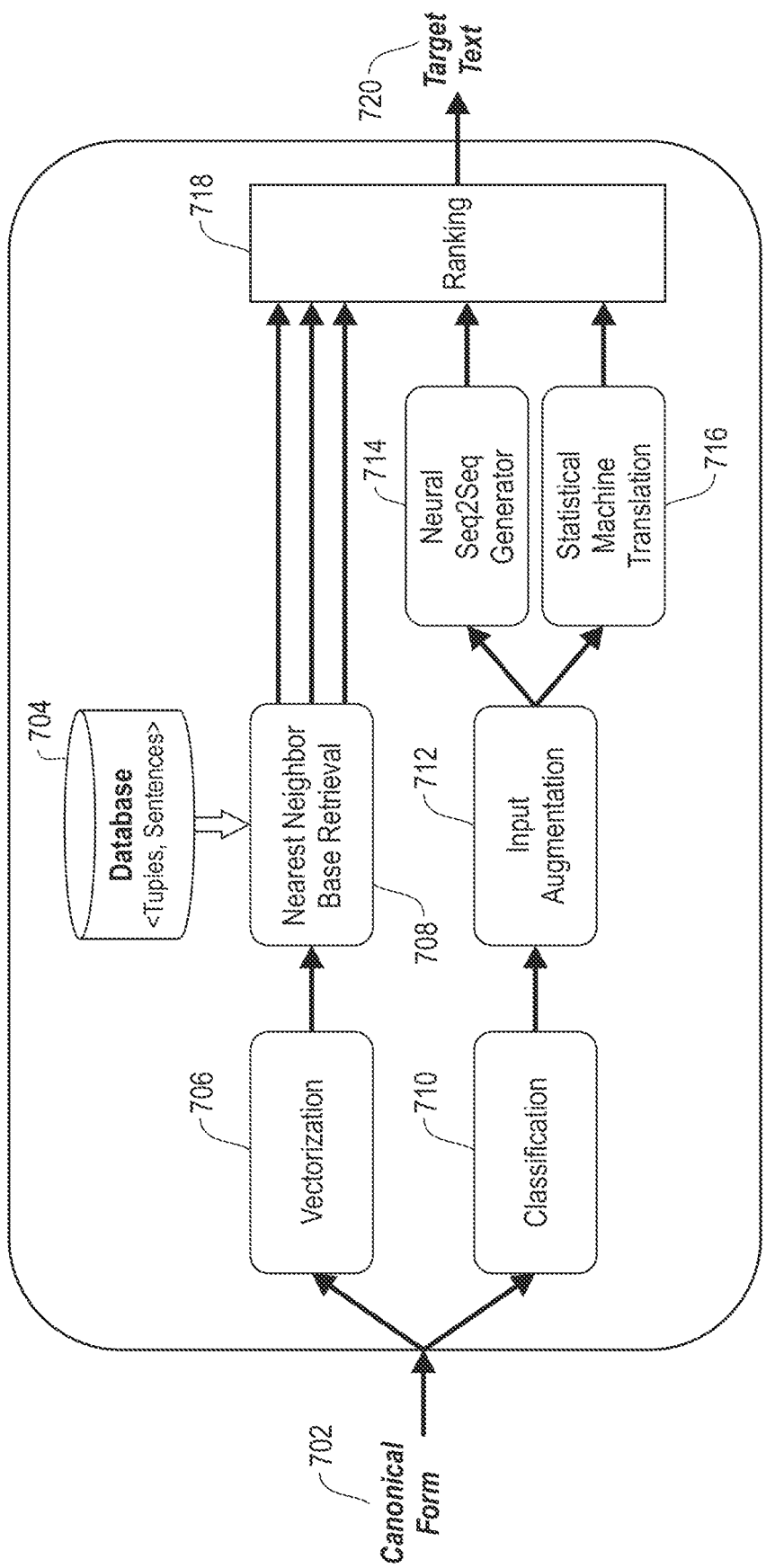
FIG. 7 is a flow diagram illustrating techniques for generating sentences from tuples according to an embodiment of the invention.

With reference now to FIG. 7, an example flow for language generator 126 will now be described.

At 702, the canonical forms of the tuples are obtained by language generator 126, e.g., from tuple generator 124.

In some embodiments, language generator 126 may use two different approaches to generate a sentence from the canonical tuple, a retrieval-based approach and a generative model-based approach. In some embodiments, only one of the approaches may be used. In some embodiments, both approaches may be used. In some embodiments one or more other approaches may be used or may be combined with the retrieval based or generative model-based approaches.

In some embodiments, prior to or in conjunction with performing one of the above approaches, language generator 126 may obtain and process a corpus of sentences, e.g., from memory 114 (FIG. 1) or memory 154 (FIG. 1). In some embodiments, the corpora of sentences may be monolingual and unlabeled. In some embodiments, the corpora of sentences may include a plurality of sentences for each domain type involved, e.g., sentences that describe table data, sentences that describe graph data, sentences that describe JSON data, sentences that describe RDF data, sentences that described any other input data domain, or combinations thereof. In some embodiments, the corpora may also include tuples associated with each sentence that may be obtained by language generator 126. In some embodiments, the tuples may be generated separately by language generator 126. For example, the sentences in the corpora may be parsed and simplified to contain subject verbs and objects. Tuples may be extracted from the parsed and simplified sentences and tagged, e.g., using standard methods. A typical standard method may involve performing dependency parsing on the simple sentence to split the sentence into subject-phrase, verb-phrase, and object/predicate phrase. The extracted <Subject phrase, verb-phrase, object/predicate-phrase> forms a tuple. The subject and object/predicate parts may be tagged using a named entity tagger.

The extracted tuples may be enriched, for example, by generating variations of the tuples using, e.g., lemmatization and synonym replacement of the relation terms such as verbs or other relational terms. The enriched tuples and corresponding sentences may be tagged and may be made domain independent, for example, as described above with respect to tuple generator 124 (FIG. 1). For example, the enriched tuples and corresponding sentences may be tagged by replacing entities with a corresponding named-entity tag. For example, Tim maybe replaced with PERSON. The tagging may be performed in both the tuple and the corresponding sentence. In some embodiments, the tuples and corresponding sentences may be added to a database 704 or otherwise stored, for example, in memory 114 (FIG. 1) of computing device 110 (FIG. 1) or memory 154 (FIG. 1) of data repository 150 (FIG. 1).

With continued reference to FIG. 7, the retrieval-based approach will be described.

Prior to or in conjunction with performance of the retrieval-based approach, language generator 126 may generate vectors for the stored tuples in the database 704, for example, using distributed representation techniques. For example, for a tuple <ORG, location, LOC>, the word to vector embedding of each entry, e.g., ORG, location, and LOC, is concatenated. If any entry in the tuple has a multiple word phrase such as, e.g., the tuple <PERSON, won award, NAME>, the word to vector embedding of each word in the multi-word phrase, e.g., the vector for won and the vector for award, may be averaged.

At 706, language generator 126 generates vectors for the obtained canonical tuples, for example, using distributed representation techniques.

At 708, the vectors of the canonical tuples are compared to the vectors of the tuples in the database 704. A similarity score is determined for each pair of canonical tuple and tuple in the database 704 based on the comparison of the vectors. The closest tuple in the database for each canonical tuple is identified based on the similarity score, e.g., the tuple with the highest score. If the similarity score of the closest tuple crosses a predetermined threshold, a corresponding sentence is generated based on the sentence corresponding to the closest tuple. For example, the words corresponding to the entity tags of the domain independent tuples in the corresponding sentences are replaced by the original entities from the raw tuples on which the canonical tuples are based.

With continued reference to FIG. 7, the generative model-based approach will be described.

Prior to or in conjunction with performance of the generative model-based approach, language generator 126 may implement or train a classifier that obtains additional signals about the morphological variations in the tuples of the corpora. The classifier is a module that takes as input a canonical form or simply a modified and tagged tuple, e.g., <ORG, locate, LOC>, and produces a "label" indicating the morphological and syntactic artifacts that should be introduced to produce a correct sentence such as, e.g., the past-tense of the verb and auxiliary verb.

Example classes of syntactic artifacts that may be introduced include:

i. VERB: Just the main verb (e.g., create);
ii. VERB_IS: Auxiliary "is"+participle of main verb (e.g., is given);
iii. VERB_HAS: Auxiliary "has"+participle of main verb (e.g., has won);
iv. VERB_PREP: Main verb+preposition (e.g., plays for);
v. VERB_IS_PREP: Main verb+"is"+preposition (e.g., is located at);
vi. VERB_HAS_PREP: Verb+"has"+preposition (e.g., has received from);
vii. NULL_IS: Copula verb "is" (e.g., is a government organization);
viii. NULL_HAS: Copula verb "has" (e.g., has information);
ix. NULL_IS_PREP: Main verb "is"+preposition (e.g., X is at Y);
x. NULL_HAS_PREP: Main verb "has"+preposition (e.g., X has Y from Z);

The 10 classes presented above are a representative example of syntactic artifacts that may be introduced into a sentence, and are not limiting. Additional or alternative syntactic artifacts may also be considered for introduction into a sentence.

In some embodiments, various generative systems based on sequence-to-sequence and statistical machine translation paradigms may be used by language generator 126 for classification of the tuples. In some embodiments, for example, the generative model may be an ensemble of a sequence-to-sequence neural model and Statistical Machine Translation (SMT), which takes a modified and tagged tuple along with the label that comes from the classifier. For example, if the original tuple is <ABC, location, Armonk> and it's modified and tagged tuple becomes <ORG, locate, LOC>, the modified and tagged tuple is passed through a classifier that produces a label like VERB_IS_PREP.

The label from the classifier is added to the tuple, making it <ORG, locate, LOC, VERB_IS_PREP>. This serves as the input to the generative model. The role of the label VERB_IS_PREP is to instruct the model to introduce morphological variation of the verb "locate" and add auxiliary verb "is" and preposition "at", and the model outputs "ORG is located at LOC". The generated sentence (with tags) is modified by replacing the tags with original words such as "ABC" and "Armonk" which were stored in a data-structure as described above, resulting in a sentence of "ABC is located at Armonk".

The classifier and generative systems may be trained using the tagged input-outputs. For example, the classifier may be trained using tuples and labels extracted from simple sentences. The tuples may be extracted as described above and labels may be extracted using part-of-speech tags such as, e.g., VERB, PREPOSITION, AUX-VERB, or other part-of-speech tags. During training of the classifier and generative mode, algorithms such as decision trees or support vector machine may be used as non-limiting examples.

At 710, the canonical tuples are classified, for example, based on the classifier.

At 712, classification signals are augmented with the tuples.

At 714, the augmented classification signals are passed through the natural sequence-to-sequence paradigm.

At 716, the augmented classification signals may also be passed through the SMT paradigm.

At 718, the output sentences from both the retrieval model approach and the generative model approach may be ranked. In some embodiments, the output sentences are noisy sentences. Language generator 126 may rank the output sentences to identify the M-best output sentences between the retrieval and generative model approaches. For example, language generator 126 may employ a scoring mechanism that considers both fluency, e.g., how good the language is, and adequacy, e.g., how factually related the generated output is with the entries in the input data. For example, the score for an output sentence may be determined according to equation (1) as follows:

$$\text{Score} = \alpha LM(Y) + \beta F(X, Y) \qquad (1)$$

Where:
X and Y are the input tuples and output sentence;
$\alpha$ and $\beta$ are parameters set by a user; and
LM and F are composite functions for measuring language model-based fluency and embedding, and string overlap-based adequacy, respectively. For example, LM is a function which gives the likelihood of the input sentence in terms of log-probability. The LM function may use an available language model to estimate the probability. The function F takes the input tuple and output tuple and checks the degree of overlap between them. The overlap may be estimated using fuzzy string matching and word-to-vector embedding based similarity (e.g., as described above). Both fuzzy matching and vector similarity are combined or added together, making it a composite function.

At 720, the output sentences and scores for each tuple are provided to paragraph synthesizer 128.

Figure 8:
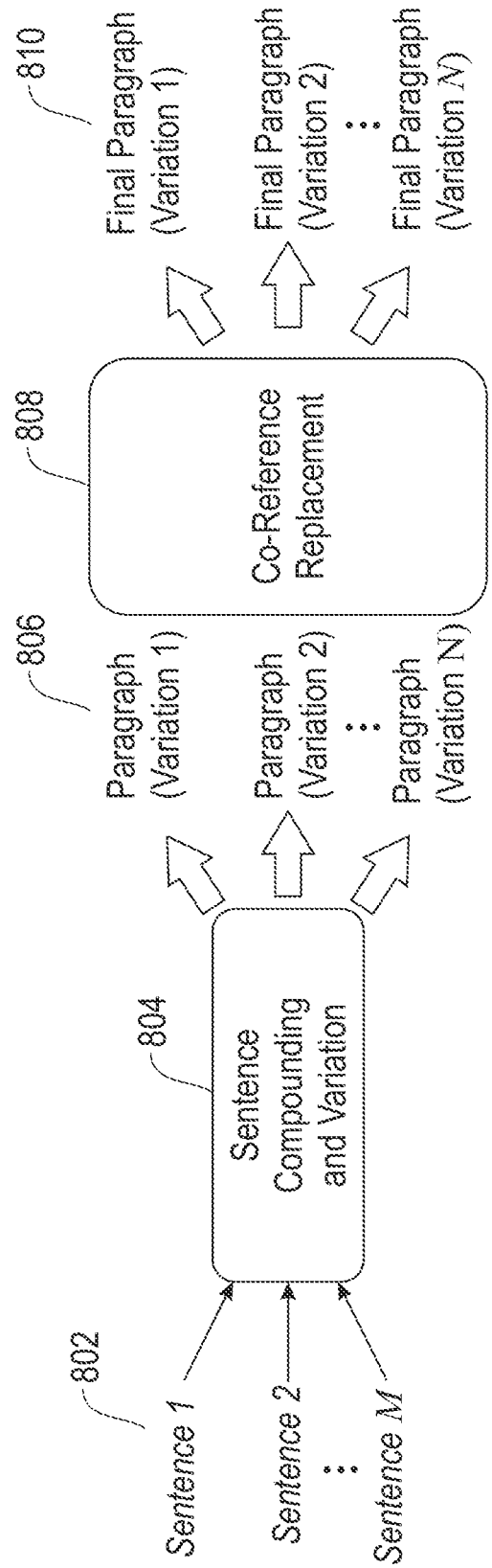
FIG. 8 is a flow diagram illustrating techniques for generating paragraph variations from sentences according to an embodiment of the invention.

With reference again to FIG. 3, at 308, the generated sentences are synthesized into paragraph variations by paragraph synthesizer 128. The flow of paragraph synthesizer will be described with reference to FIG. 8.

At 802, the sentences generated by language generator 126 are obtained by paragraph synthesizer 128. For example, paragraph synthesizer 128 may select one of the obtained sentences for each canonical tuple and may form a list of the selected sentences.

At 804, paragraph synthesizer 128 segments the list into S sub lists randomly. For each sub list, a compounding module may be invoked that combines the sentences within the sub list into compound and/or complex sentences. In some embodiments, the compounding module may take two sentences at a time and combines them based on heuristics. In some embodiments three or more sentences may be combined at a time.

One example heuristic may include dropping the subject of the second sentence and replacing the subject by the word "and" if the subject of the two sentences match exactly. Other heuristics may be used by the compounding module to perform coordinate conjunction and sub-ordinate conjunction-based compounding. A non-limiting example of a compounding may include compounding the sentences "ABC is located at Armonk" and "ABC has CEO Tim" based on the above-mentioned example heuristic to give rise to "ABC is located in Armonk and has CEO Tim". To detect the subject, a dependency structure, sometimes referred to as the dependency parse tree, that identifies dependencies of the sentence may be utilized.

At 806, paragraph synthesizer 128 combines the compound or complex sentences together to generate paragraph variations.

At 808, paragraph synthesizer 128 identifies repetitive entities in the paragraph variations and replaces the repetitive entities with appropriate coreferences. In some embodiments, meta information about the entities such as, e.g., gender, number and person may be utilized for forming heuristics.

As an example, a repetitive entity may be an entity (e.g., ABC) that appears more than once within the sentence or in adjacent sentences. For example, in the paragraph "ABC is located at Armonk. Tim is ABC's CEO", the entity "ABC" is repetitive as it appears twice in two consecutive sentences. In this example, the second reference to ABC may be replaced by an appropriate coreference such as, e.g., "its". In one example, the coreference replacement technique may be based on the heuristic that if the gender of the repeating entity is male and it is the subject of the sentence, it will be replaced with "He," else if the gender is female, it will be replaced with "she," else it will be "it." Similar heuristics may be used for possessives (his/her/its) and objects (him/her/it).

In some embodiments, for example, the gender detection may be performed by a support vector classifier that is trained on multiple names gathered from various name web sites.

At 810, final paragraph variations are generated based on the co-referencing. In some embodiments, structure-to-text generator 122 may repeat the flow of step 308, including the flow of FIG. 8 performed by paragraph synthesizer 128, until N variations are obtained where, for example, N may be a pre-determined number, a number set by user input, or a number determined in any other manner.

Referring back to FIG. 3, at 310, the generated final paragraph variations are output as natural language descriptions of the input data. For example, the paragraph variations may be presented to a user via display 118, transmitted to another computing device for presentation in a remote location, or used in any other manner.

Additionally, the techniques depicted in FIGS. 3-8 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 112. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
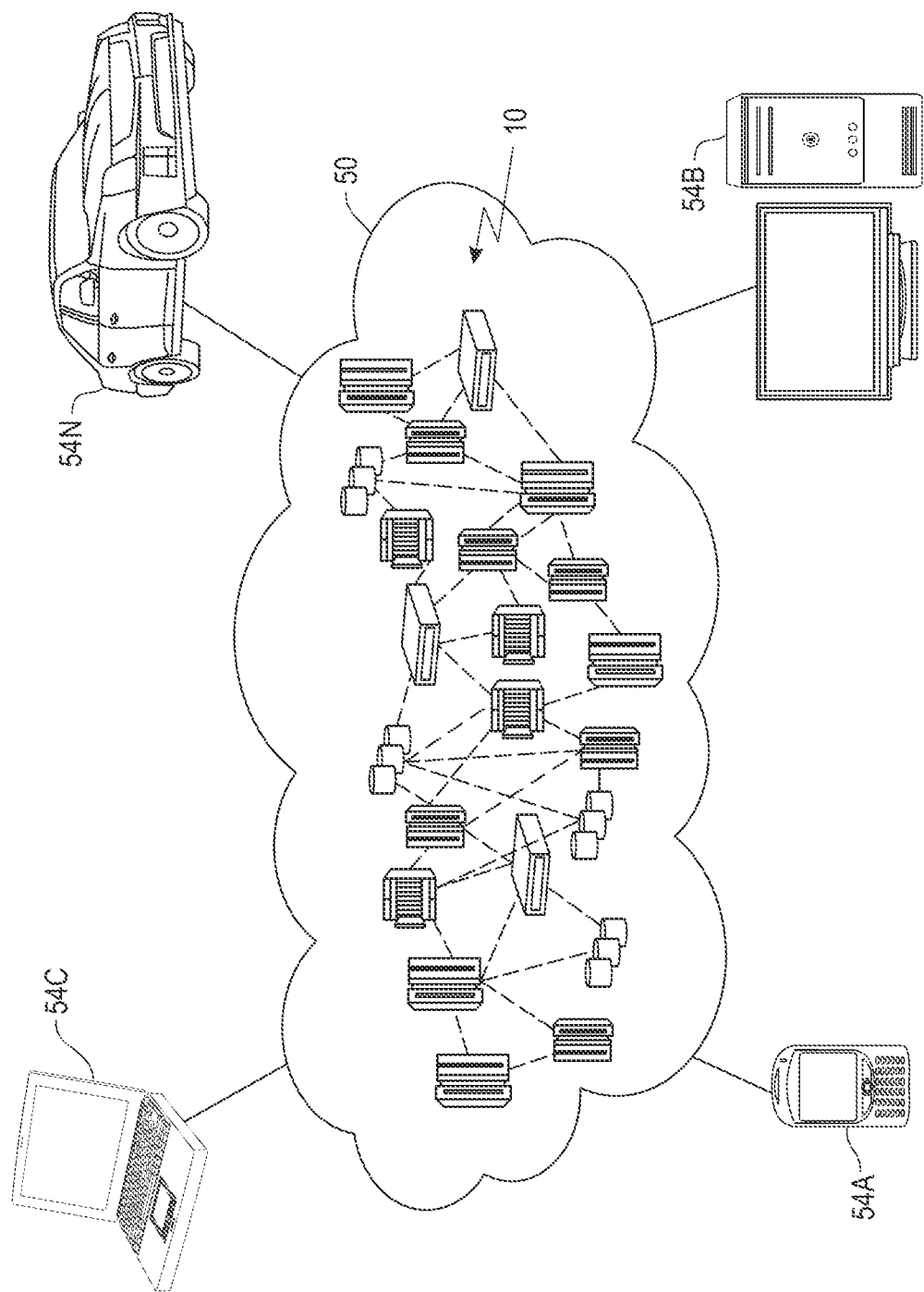
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
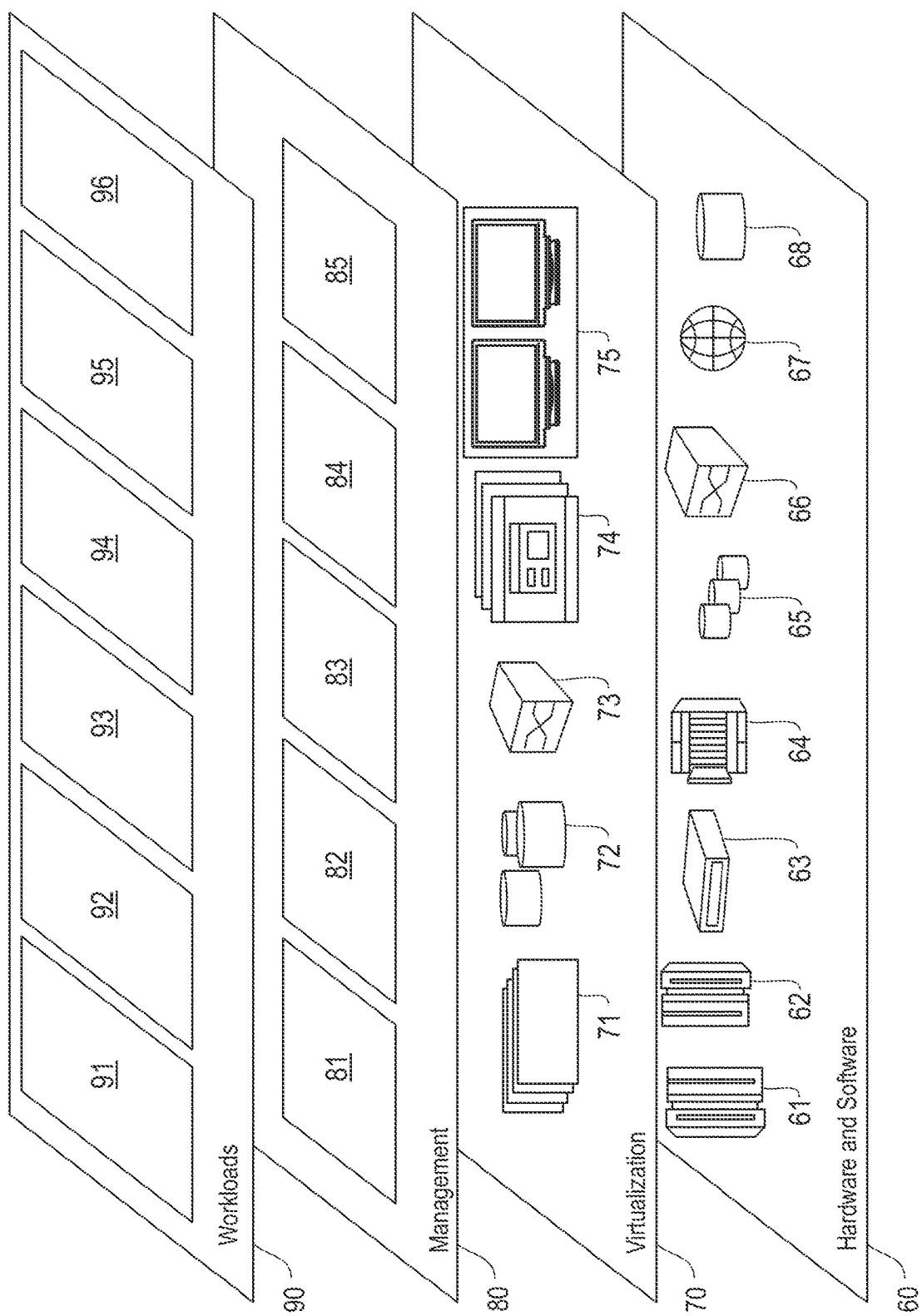
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generation of variable natural language descriptions from structured data 96.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising steps of:
   receiving input data;
   generating a first plurality of tuples based on the received input data;
   obtaining (i) a first plurality of sentences and (ii) a corresponding second plurality of tuples from a data repository, the first plurality of sentences and corresponding second plurality of tuples obtained based on the first plurality of tuples, the first plurality of sentences generated based on the second plurality of tuples;
   generating a second plurality of sentences based on (i) the second plurality of tuples, (ii) the first plurality of sentences, and (iii) the first plurality of tuples;
   selecting a sentence for each of the first plurality of tuples from (i) the first plurality of sentences and (ii) the second plurality of sentences;
   generating at least one paragraph variation, each paragraph variation generated based on two or more of the selected sentences; and
   presenting the at least one paragraph variation as a natural language description of the input data;
   wherein the steps are carried out by at least one computing device.

2. The computer-implemented method of claim 1, wherein said generating the first plurality of tuples based on the received input data comprises:
   identifying a plurality of entities in the input data;
   determining relationships between the identified plurality of entities in the input data;
   forming a third plurality of tuples based on (i) the identified plurality of entities and (ii) the determined relationships between the identified plurality of entities; and
   performing lemmatization on the formed third plurality of tuples to generate the first plurality of tuples.

3. The computer-implemented method of claim 1, wherein the first plurality of tuples is domain-independent with respect to a domain of the input data.

4. The computer-implemented method of claim 3, wherein the domain of the input data are a domain selected from the group consisting of a table, a graph, a tree, a JavaScript Object Notation (JSON), a Resource Description Framework (RDF), and combinations thereof.

5. The computer-implemented method of claim 1, comprising:
   generating the second plurality of tuples, the generation of the second plurality of tuples comprising:
      parsing a corpus of raw sentences to generate a third plurality of tuples, each tuple in the third plurality of tuples corresponding to a raw sentence in the corpus;
      generating tuple variations based on the third plurality of tuples; and
      adding the tuple variations to the third plurality of tuples to generate the second plurality of tuples, each tuple variation corresponding to a raw sentence in the corpus; and
   storing the second plurality of tuples in the data repository.

6. The computer-implemented method of claim 5, wherein said generating the tuple variations based on the third plurality of tuples comprises:
   obtaining (i) morphosyntactic variations and (ii) synonyms for the third plurality of tuples; and
   generating the tuple variations based on (i) the obtained morphosyntactic variations and (ii) synonyms.

7. The computer-implemented method of claim 1, wherein said generating the second plurality of sentences based on (i) the second plurality of tuples, (ii) the first plurality of sentences, and (iii) the first plurality of tuples comprises:
   generating vectors for the first plurality of tuples;
   determining a similarity between (i) the vectors for the first plurality of tuples and (ii) vectors for the second plurality of tuples;
   determining that the similarity between (i) a vector for a given tuple in the first plurality of tuples and (ii) a vector for a given tuple in the second plurality of tuples meets a predetermined threshold; and
   in response to determining that the similarity meets the predetermined threshold, generating the sentence for the given tuple in the first plurality of tuples based on the sentence corresponding to the given tuple in the second plurality of tuples.

8. The computer-implemented method of claim 7, wherein said generating the sentence for the given tuple in the first plurality of tuples based on the sentence corresponding to the given tuple in the second plurality of tuples comprises:
   generating a first sentence based on the sentence corresponding to the given tuple in the second plurality of tuples, the first sentence comprising at least one entity tag; and
   generating the sentence for the given tuple in the first plurality of tuples by replacing each entity tag of the first sentence with a corresponding entity from the given tuple in the first plurality of tuples.

9. The computer-implemented method of claim 1, wherein said generating the second plurality of sentences based on (i) the second plurality of tuples, (ii) the first plurality of sentences, and (iii) the first plurality of tuples comprises:
   training a classifier based on the second plurality of tuples;
   classifying the first plurality of tuples based on the trained classifier; and
   generating the second plurality of sentences based on the classifications.

10. The computer-implemented method of claim 1, comprising:
    generating (i) a fluency score and (ii) an adequacy score for each sentence in the first plurality of sentences and second plurality of sentences; and ranking (i) the first plurality of sentences and (ii) the second plurality of sentences based on the generated fluency scores and adequacy scores,
wherein selecting the sentence for each of the first plurality of tuples from the first plurality of sentences and the second plurality of sentences comprises selecting the sentence based on the ranking.

11. The computer-implemented method of claim 1, wherein said generating the at least one paragraph variation, comprises:
generating a list of sentences from the sentences selected for each of the first plurality of tuples;
segmenting the list into a plurality of sub-lists;
compounding sentences within each sub-list into a plurality of compound sentences; and
generating the at least one paragraph variation based on the plurality of compounded sentences.

12. The computer-implemented method of claim 11, wherein said generating the at least one paragraph variation based on the plurality of compound sentences comprises:
combining the compound sentences to form a plurality of initial paragraphs;
identifying repetitive entities in the plurality of initial paragraphs;
replacing identified repetitive entities with co-reference entities in the plurality of initial paragraphs to form a plurality of final paragraphs; and
generating the at least one paragraph variation based on the plurality of final paragraphs.

13. A computer program product comprising a computer readable storage medium having program instructions embodied therewith, the program instructions executable by a computing device to cause the computing device to:
receive input data;
generate a first plurality of tuples based on the received input data;
obtain (i) a first plurality of sentences and (ii) a corresponding second plurality of tuples from a data repository based on the first plurality of tuples, the first plurality of sentences generated based on the second plurality of tuples;
generate a second plurality of sentences based on (i) the second plurality of tuples, (ii) the first plurality of sentences, and (iii) the first plurality of tuples;
select a sentence for each of the first plurality of tuples from (i) the first plurality of sentences and (ii) the second plurality of sentences;
generate at least one paragraph variation, each paragraph variation generated based on two or more of the selected sentences; and
present the at least one paragraph variation as a natural language description of the input data.

14. The computer program product of claim 13, wherein generating the first plurality of tuples based on the received input data comprises:
identifying a plurality of entities in the input data;
determining relationships between the identified plurality of entities in the input data;
forming a third plurality of tuples based on the identified plurality of entities and the determined relationships between the identified plurality of entities; and
performing lemmatization on the formed third plurality of tuples to generate the first plurality of tuples.

15. The computer program product of claim 13, the program instructions further executable by the computing device to cause the computing device to generate the second plurality of tuples, the generation of the second plurality of tuples comprising:
parsing a corpus of raw sentences to generate a third plurality of tuples, each tuple in the third plurality of tuples corresponding to a raw sentence in the corpus;
generating tuple variations based on the third plurality of tuples; and
adding the tuple variations to the third plurality of tuples to generate the second plurality of tuples, each tuple variation corresponding to a raw sentence in the corpus; and
storing the second plurality of tuples in the data repository.

16. The computer program product of claim 13, wherein said generating the second plurality of sentences based on (i) the second plurality of tuples, (ii) the first plurality of sentences, and (iii) the first plurality of tuples comprises:
generating vectors for the first plurality of tuples;
determining a similarity between (i) the vectors for the first plurality of tuples and (ii) vectors for the second plurality of tuples;
determining that the similarity between (i) a vector for a given tuple in the first plurality of tuples and (ii) a vector for a given tuple in the second plurality of tuples meets a predetermined threshold; and
in response to determining that the similarity meets the predetermined threshold, generating the sentence for the given tuple in the first plurality of tuples based on the sentence corresponding to the given tuple in the second plurality of tuples.

17. The computer program product of claim 13, wherein said generating the second plurality of sentences based on (i) the second plurality of tuples, (ii) the first plurality of sentences, and (iii) the first plurality of tuples comprises:
training a classifier based on the second plurality of tuples;
classifying the first plurality of tuples based on the trained classifier; and
generating the second plurality of sentences based on the classifications.

18. The computer program product of claim 13, the program instructions further executable by the computing device to cause the computing device to:
generate (i) a fluency score and (ii) an adequacy score for each sentence in the first plurality of sentences and second plurality of sentences; and
rank (i) the first plurality of sentences and (ii) the second plurality of sentences based on the generated fluency scores and adequacy scores,
wherein selecting the sentence for each of the first plurality of tuples from the first plurality of sentences and the second plurality of sentences comprises selecting the sentence based on the ranking.

19. A system comprising:
a memory; and
at least one processor operably coupled to the memory and configured for:
receiving input data;
generating a first plurality of tuples based on the received input data;
obtaining (i) a first plurality of sentences and (ii) a corresponding second plurality of tuples from a data repository based on the first plurality of tuples, the first plurality of sentences generated based on the second plurality of tuples;

generating a second plurality of sentences based on (i) the second plurality of tuples, (ii) the first plurality of sentences, and (iii) the first plurality of tuples;

selecting a sentence for each of the first plurality of tuples from (i) the first plurality of sentences and (ii) the second plurality of sentences;

generating at least one paragraph variation, each paragraph variation generated based on two or more of the selected sentences; and presenting the at least one paragraph variation as a natural language description of the input data.

20. A computer-implemented method, the method comprising steps of:

obtaining a corpus of raw sentences from a data repository;

parsing the corpus of raw sentences to generate a plurality of tuples, each tuple corresponding to a raw sentence in the corpus;

generating tuple variations based on the plurality of tuples;

adding the tuple variations to the plurality of tuples to generate a second plurality of tuples, each tuple variation corresponding to a raw sentence in the corpora;

replacing entities in the second plurality of tuples with domain-independent tags to form a plurality of tagged tuples;

generating a label for each tagged tuple based on the corresponding raw sentence;

training a classifier based on (i) the tagged plurality of tuples and (ii) corresponding generated labels;

augmenting the tagged plurality of tuples based on the corresponding generated labels to generate a plurality of augmented tuples; and training a generative model based on (i) the augmented tuples and (ii) the corresponding raw sentences;

wherein (i) the trained classifier and (ii) the trained generative model are together configured to generate a plurality of sentences based on a set of input data; and wherein the steps are carried out by at least one computing device.

* * * * *